US012055275B1

(12) United States Patent
Zou

(10) Patent No.: US 12,055,275 B1
(45) Date of Patent: Aug. 6, 2024

(54) STRING LAMP

(71) Applicant: Xinjiang Zou, Meizhou (CN)

(72) Inventor: Xinjiang Zou, Meizhou (CN)

( * ) Notice: Subject to any disclaimer, the term of this patent is extended or adjusted under 35 U.S.C. 154(b) by 0 days.

(21) Appl. No.: 18/318,098

(22) Filed: May 16, 2023

(51) Int. Cl.

| | |
|---|---|
| ***F21V 19/00*** | (2006.01) |
| ***F21K 9/235*** | (2016.01) |
| ***F21S 4/10*** | (2016.01) |
| ***F21V 3/02*** | (2006.01) |
| ***F21V 17/06*** | (2006.01) |
| ***F21W 121/04*** | (2006.01) |
| ***F21Y 115/20*** | (2016.01) |

(52) U.S. Cl.
CPC ................ *F21K 9/235* (2016.08); *F21S 4/10* (2016.01); *F21V 3/02* (2013.01); *F21V 17/06* (2013.01); *F21V 19/0005* (2013.01); *F21V 2200/40* (2015.01); *F21W 2121/04* (2013.01); *F21Y 2115/20* (2016.08)

(58) Field of Classification Search
CPC ........ F21V 3/02; F21V 17/06; F21V 19/0005; F21V 2200/40; F21S 4/10; F21K 9/235
See application file for complete search history.

(56) References Cited

U.S. PATENT DOCUMENTS

| | | | | |
|---|---|---|---|---|
| 5,626,415 | A * | 5/1997 | Huang | F21V 17/06 362/267 |
| 6,079,848 | A * | 6/2000 | Ahroni | H01R 4/242 439/699.1 |
| 6,817,733 | B2 * | 11/2004 | Frei | F21S 6/001 362/249.06 |
| 7,070,443 | B2 * | 7/2006 | Tashiro | F21V 21/002 439/404 |
| 7,118,249 | B2 * | 10/2006 | Hsu | F21V 21/08 362/249.06 |
| 10,627,096 | B2 * | 4/2020 | Bukkems | F21V 5/02 |
| 11,391,421 | B2 * | 7/2022 | Huang | F21V 17/101 |

* cited by examiner

*Primary Examiner* — Arman B Fallahkhair

(57) ABSTRACT

The present disclosure provides a new string lamp, including a power line provided with string lamp bodies that are arranged in sequence. Each string lamp body includes a lamp cap part and a lamp bulb part. The power line penetrates through an inside of the lamp cap part and is electrically connected to the lamp bulb part. The inside of the lamp cap part is provided with a plurality of metal terminals. Each metal terminal has an upper end provided with a pointed penetrating part. The pointed penetrating part of each metal terminal penetrates through a plastic sheath of the power line and is electrically conductive to a line core of the power line. The lamp bulb part is divided into a plug-in type lamp bulb or a screw type lamp bulb.

8 Claims, 31 Drawing Sheets

STRING LAMP

TECHNICAL FIELD

The present disclosure relates to the technical field of string lamps, more particular to a new string lamp.

BACKGROUND

At Christmas, to enhance the festive atmosphere, it already becomes a necessary matter to decorate using Christmas trees. In order to improve the decorative effect of the Christmas trees, ornaments are hung on the Christmas trees most of the time, and string lamps also become necessary ornaments of Christmas.

A string lamp includes a power line, a male connector connected to one end of the power line, and a female connector connected to the other end of the power line. The power line is provided with string lamp bodies that are arranged in sequence. Each string lamp body includes a lamp cap part and a lamp bulb part. The power line penetrates through an inside of the lamp cap part and is electrically connected to the lamp bulb part.

It is to be noted that for the string lamps in the existing technologies, the string lamp body cannot emit variable colors of light, with a poor decorative effect.

SUMMARY

In view of the shortcomings in the existing technologies, the present disclosure aims to provide a new string lamp, which is novel in structural design and convenient in demounting and repair.

In order to achieve the above aim, the present disclosure is implemented through the following technical solution.

A new string lamp includes a power line provided with string lamp bodies that are arranged in sequence. Each string lamp body includes a lamp cap part and a lamp bulb part. The power line penetrates through an inside of the lamp cap part and is electrically connected to the lamp bulb part.

The inside of the lamp cap part is provided with a plurality of metal terminals. Each metal terminal has an upper end provided with a pointed penetrating part projecting upward and extending in a spike shape. The pointed penetrating part of each metal terminal penetrates through a plastic sheath of the power line and is electrically conductive to a line core of the power line.

The lamp bulb part is a plug-in type lamp bulb or a screw type lamp bulb.

For the plug-in type lamp bulb, the lamp bulb part includes a plastic core and a light-emitting source arranged on the plastic core. The light-emitting source is provided with a plurality of light source pins. The lamp cap part is provided with an insertion part. The plastic core is inserted into the insertion part of the lamp cap part, and each light source pin of the light-emitting source contacts and is electrically conductive to a corresponding metal terminal.

For the screw type lamp bulb, the lamp bulb part includes a power connection copper head and a light-emitting source. The light-emitting source is provided with a plurality of light source pins. The power connection copper head is provided with copper head connection parts corresponding to each light source pin of light-emitting source respectively. Each light source pin of the light-emitting source contacts and is electrically conductive to a corresponding copper head connection part of the power connection copper head. The power connection copper head of the lamp bulb part is screwed onto the lamp cap part, and each copper head connection part of the power connection copper head contacts and is electrically conductive to a corresponding metal terminal.

Herein, the lamp cap part includes a lamp cap main body and a lamp cap top cover buckled on an upper end of the lamp cap main body. The power line penetrating through the inside of the lamp cap part is clamped between the lamp cap main body and the lamp cap top cover. The lamp cap main body is formed with terminal mounting holes corresponding to each of the metal terminals respectively, and each metal terminal is clamped into a corresponding terminal mounting hole.

For the plug-in type lamp bulb, the insertion part is arranged on the lamp cap main body, and a lower end of each metal terminal extends to the insertion part.

For the screw type lamp bulb, the power connection copper head is screwed onto the lamp cap main body.

Herein, for the plug-in type lamp bulb, a lower end of the plastic core is sleeved with a light guide column, and the light-emitting source extends into the light guide column.

Herein, for the screw type lamp bulb, the power connection copper head includes a copper head upper part, an intermediate plastic sleeve and a copper head lower part. The copper head upper part is sleeved on an upper end of the intermediate plastic sleeve, the copper head lower part is sleeved on a lower end of the intermediate plastic sleeve, the copper head upper part is provided with two copper head connection parts that are spaced and insulated from one another, and the copper head lower part is provided with one copper head connection part.

Herein, the lamp bulb part further includes a light guide column. The light guide column has an upper end provided with an end sealing plastic element. The end sealing plastic element is of a plastic element structure formed by glue application technologies, or the end sealing plastic element is of a plastic plug structure. The light-emitting source extends into the light guide column and is fixed to the light guide column through the end sealing plastic element.

Herein, the light guide column is screwed onto the power connection copper head.

Herein, the lamp bulb part further includes a transparent lamp shell, and the transparent lamp shell is screwed onto the lamp cap part.

Herein, the lamp bulb part further includes a transparent lamp shell, the transparent lamp shell is screwed onto the power connection copper head, the transparent lamp shell is sleeved around the light guide column, and the light guide column is fixed to an upper end of the transparent lamp shell.

Herein, a lamp cap encapsulation element is injection molded around the lamp cap part.

Herein, the light-emitting source is an RGB lamp strip or an RGB lamp bead, and the light source pin of the light-emitting source is provided with a resistor.

The present disclosure has the following beneficial effects. A new string lamp provided by the present disclosure includes a power line provided with string lamp bodies that are arranged in sequence. Each string lamp body includes a lamp cap part and a lamp bulb part. The power line penetrates through an inside of the lamp cap part and is electrically connected to the lamp bulb part. The inside of the lamp cap part is provided with a plurality of metal terminals. Each metal terminal has an upper end provided with a pointed penetrating part projecting upward and extending in a spike shape. The pointed penetrating part of each metal terminal penetrates through a plastic sheath of the power line and is electrically conductive to a line core of the power line. The lamp bulb part is a plug-in type lamp bulb or a screw type lamp bulb. For the plug-in type lamp bulb, the lamp bulb part includes a plastic core and a light-emitting source arranged on the plastic core. The light-emitting source is provided with a plurality of light source pins. The lamp cap part is provided with an insertion part. The plastic core is inserted into the insertion part of the lamp cap part, and each light source pin of the light-emitting source contacts and is electrically conductive to a corresponding metal terminal. For the screw type lamp bulb, the lamp bulb part includes a power connection copper head and a light-emitting source. The light-emitting source is provided with a plurality of light source pins. The power connection copper head is provided with copper head connection parts corresponding to each light source pin of light-emitting source respectively. Each light source pin of the light-emitting source contacts and is electrically conductive to a corresponding copper head connection part of the power connection copper head. The power connection copper head of the lamp bulb part is screwed onto the lamp cap part, and each copper head connection part of the power connection copper head contacts and is electrically conductive to a corresponding metal terminal. According to the above structural design, the present disclosure is novel in structural design and convenient in demounting and repair.

BRIEF DESCRIPTION OF DRAWINGS

The present disclosure is described below in further detail in conjunction with drawings. However, the embodiments in the drawings do not constitute any restriction to the present disclosure.

Figure 1:
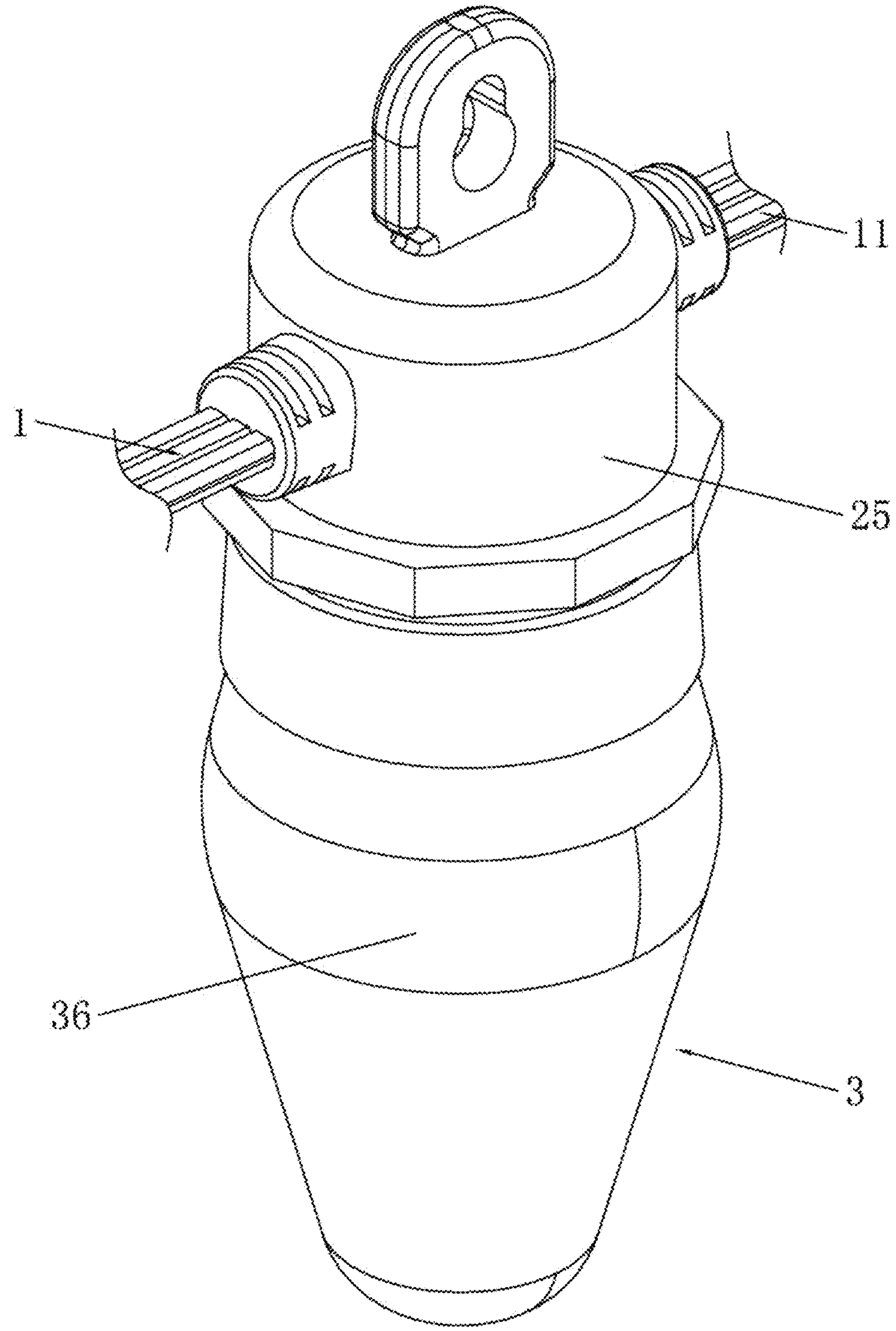
FIG. 1 is a structure diagram of a first embodiment.

Below is the description of designators shown in FIG. 1 to FIG. 31.

1, a power line; 11, a power branch line; 2, a lamp cap part; 21, a metal terminal; 211, a pointed penetrating part; 22, an insertion part; 23, a lamp cap main body; 231, a terminal mounting hole; 24, a lamp cap top cover; 25, a lamp cap encapsulation element; 26, ring groove; 3, a lamp bulb part; 31, a plastic core; 32, a light-emitting source; 321, a light source pin; 322, a resistor; 33, a power connection copper head; 331, a copper head upper part; 332, an intermediate plastic sleeve; 333, a copper head lower part; 34, a light guide column; 35, an end sealing plastic element; and 36, a transparent lamp shell.

DETAILED DESCRIPTION

The present disclosure is described below in specific embodiments.

Embodiment 1: as shown in FIG. 1 to FIG. 12, a new string lamp includes a power line 1 provided with string lamp bodies that are arranged in sequence. Each string lamp body includes a lamp cap part 2 and a lamp bulb part 3. The power line 3 penetrates through an inside of the lamp cap part 2 and is electrically connected to the lamp bulb part 3.

Herein, the power line 1 may be of a two-wire structure or three-wire structure. The power line 1 of a two-wire structure includes two power branch lines 11, respectively being a positive line and a negative line. The power line 1 of a three-wire structure includes three power branch lines 11, respectively being a positive line, a negative line and a signal line. The inside of the lamp cap part 2 is provided with metal terminals 21 corresponding to each power branch line 11 respectively. Each metal terminal 21 has an upper end provided with a pointed penetrating part 211 projecting upward and extending in a spike shape. The pointed penetrating part 211 of each metal terminal 21 penetrating through a plastic sheath of a corresponding power branch line 11 and is electrically conductive to a line core of the power branch line 11.

Further, for a plug-in type lamp bulb which is applicable to the power line 1 of a two-wire structure or a three-wire structure, the lamp bulb part 3 includes a plastic core 31 and a light-emitting source 32 arranged on the plastic core 31. The light-emitting source 32 is provided with a plurality of light source pins 321. A light-emitting source with three light source pins 321 is an RGB light source, and the three light source pins 321 of the light-emitting source 32 are a light source positive pin, a light source negative pin and a light source signal pin respectively. The lamp cap part 2 is provided with an insertion part 22, the plastic core 31 is inserted into the insertion part 22 of the lamp cap part 2, and each light source pin 321 of the light-emitting source 32 contacts and is electrically conductive to a corresponding metal terminal 21. Herein, the light-emitting source 32 is an RGB lamp strip or an RGB lamp bead.

It is to be noted that, as shown in FIG. 2, FIG. 3, FIG. 4, FIG. 8 and FIG. 9, the lamp cap part 2 includes a lamp cap main body 23 and a lamp cap top cover 24 buckled on an upper end of the lamp cap main body 23. The power line 1 penetrating through the inside of the lamp cap part 2 is clamped between the lamp cap main body 23 and the lamp cap top cover 24. The lamp cap main body 23 is formed with terminal mounting holes 231 corresponding to each of the metal terminals 21 respectively, and each metal terminal 21 is clamped into a corresponding terminal mounting hole 231. The insertion part 22 is arranged on the lamp cap main body 23, and a lower end of each metal terminal 21 extends to the insertion part 22. A ring groove 26 is arranged around the insertion part 22.

Further, for the above plug-in type lamp bulb, a lower end of the plastic core 31 is sleeved with a light guide column 34, and the light-emitting source 32 extends into the light guide column 34. Herein, a waterproof rubber ring is arranged between the light guide column 34 and the plastic core 31, to improve the waterproof sealing effect at the connection position. It is to be explained that light guide column 34 in the present Embodiment 1 may employ the styles shown in FIG. 2, FIG. 5 and FIG. 9, also may employ the styles shown in FIG. 10 to FIG. 12.

In addition, the lamp bulb part 3 further includes a transparent lamp shell 36, and the transparent lamp shell 36 is screwed onto the lamp cap part 2. An opening of the transparent lamp shell 36 is inserted in the ring groove 26.

For the new string lamp of the present Embodiment 1, during the installation process of the lamp bulb part 3, the plastic core 31 together with the light-emitting source 32 is aligned and inserted into the insertion part 22 of the lamp cap main body 23. When the plastic core 31 is inserted in place, the light source positive pin of the light-emitting source 32 is electrically conductive to the positive line of the power line 1 through a corresponding metal terminal 21, the light source negative pin of the light-emitting source 32 is electrically conductive to the negative line of the power line 1 through a corresponding metal terminal 21, and the light source signal pin of the light-emitting source 32 is electrically conductive to the signal line of the power line 1 through a corresponding metal terminal 21. After the insertion of the plastic core 31, a transparent lampshade is screwed onto a lower end of the lamp cap main body 23. The above plug-in type lamp bulb structure is convenient and quick to install and easy to replace and repair.

It is to be emphasized that the light-emitting source 32 in the present Embodiment 1 is an RGB light source, which can emit variable colors of light. When string lamps are employed for environment decoration, the string lamp in the present Embodiment 1 can emit variable colors of light, with a good decoration effect.

Figure 2:
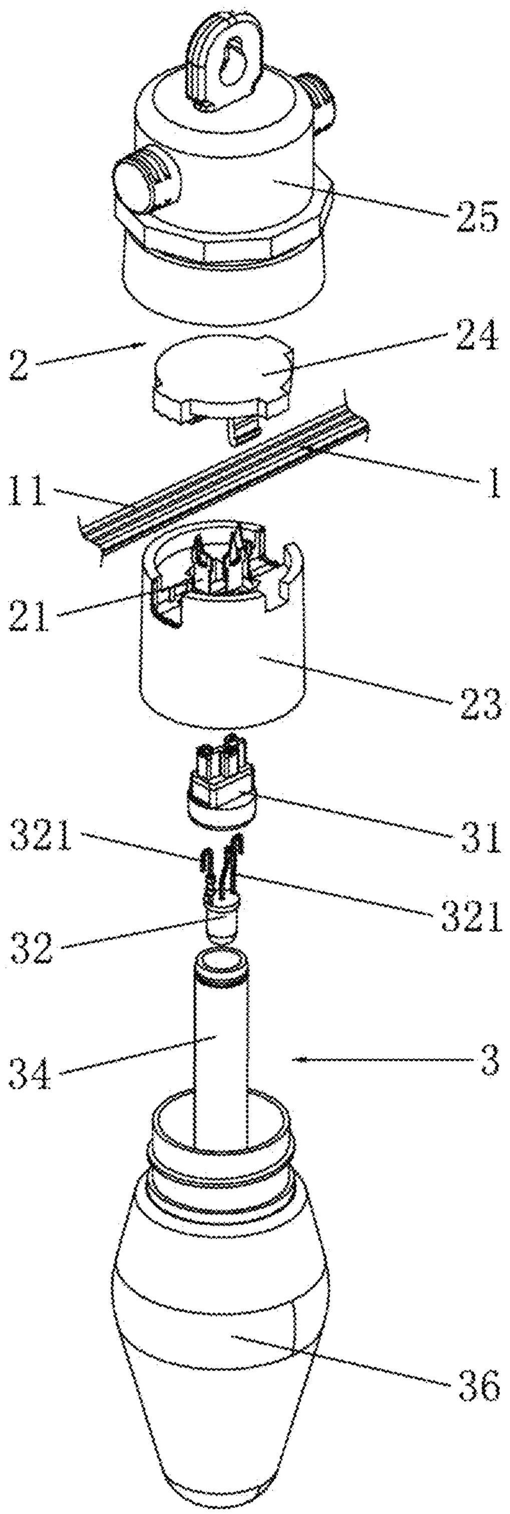
FIG. 2 is an exploded view of FIG. 1.
Figure 3:
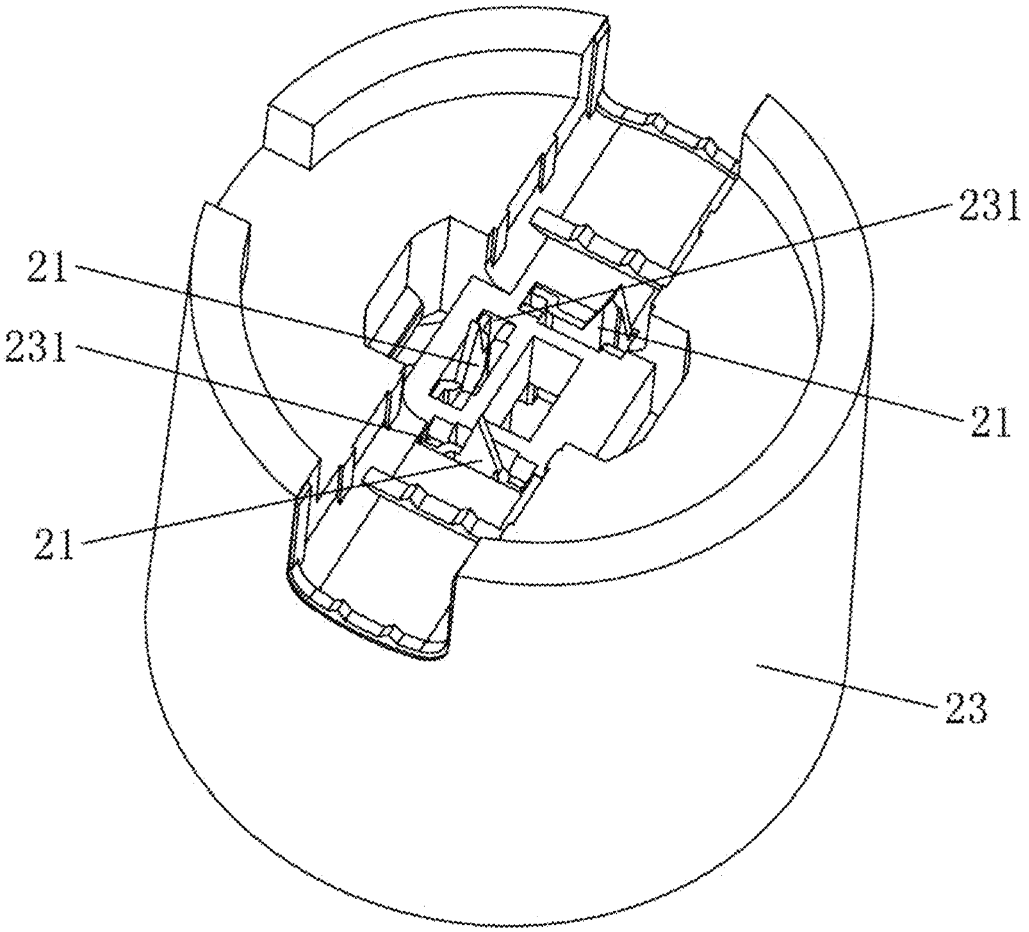
FIG. 3 is a structure diagram of a lamp cap part of a first embodiment.
Figure 4:
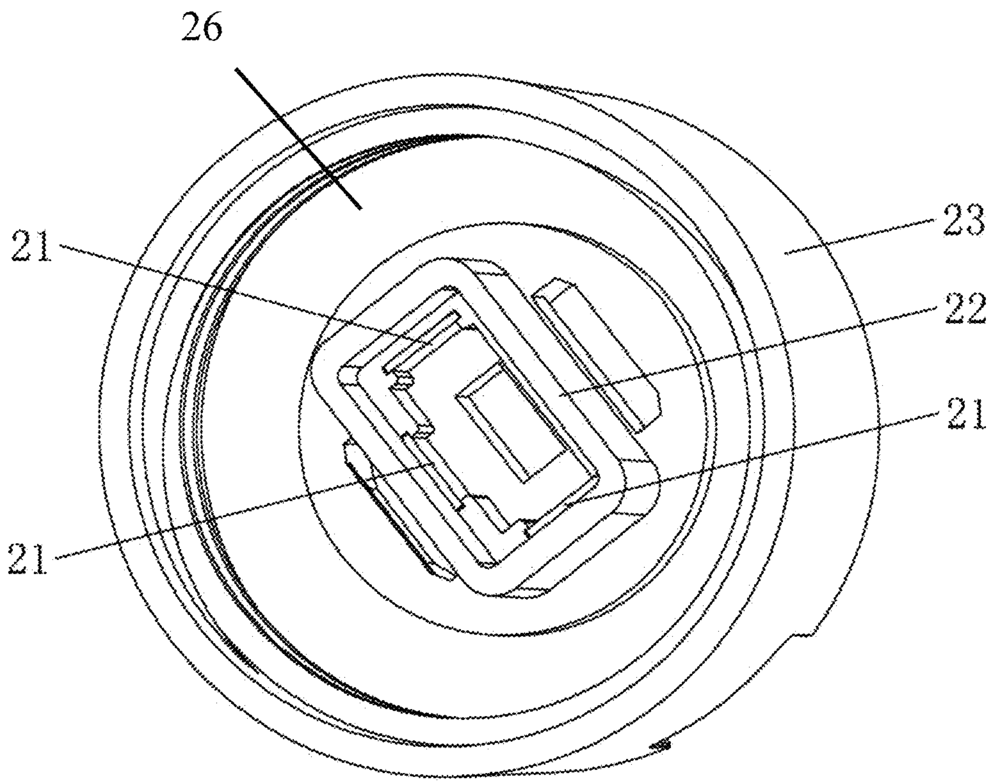
FIG. 4 is a structure diagram of a lamp cap part of a first embodiment from another view.
Figure 5:
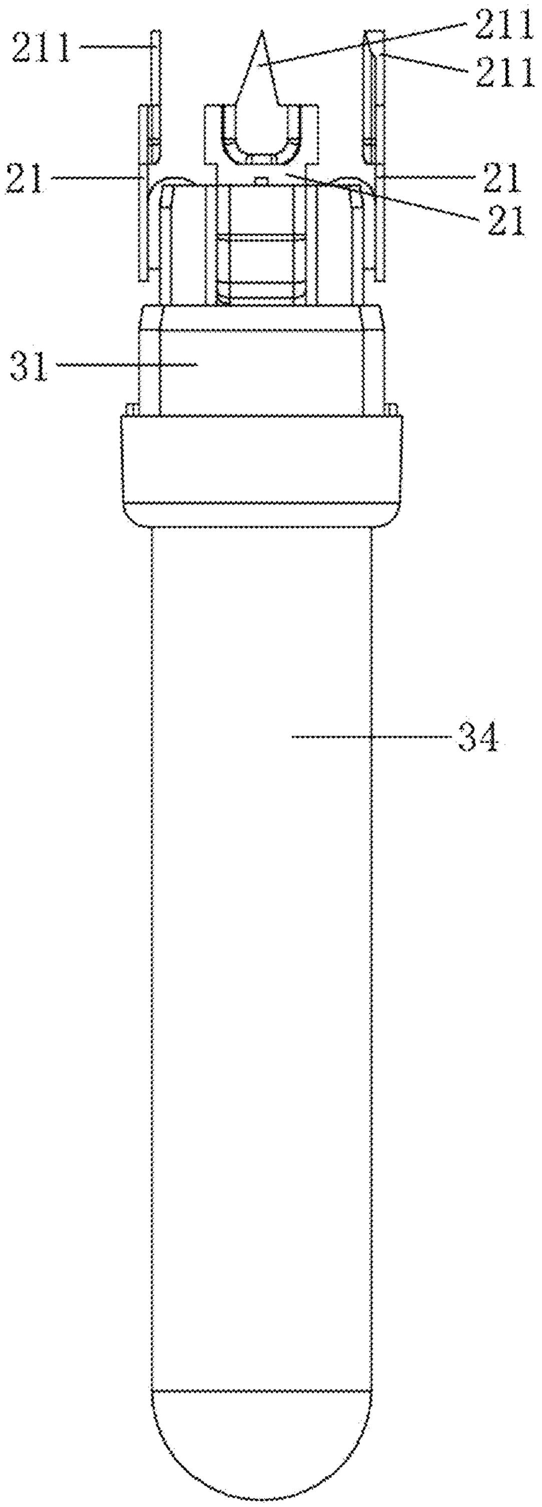
FIG. 5 is a structure diagram of a lamp bulb part of a first embodiment.
Figure 6:
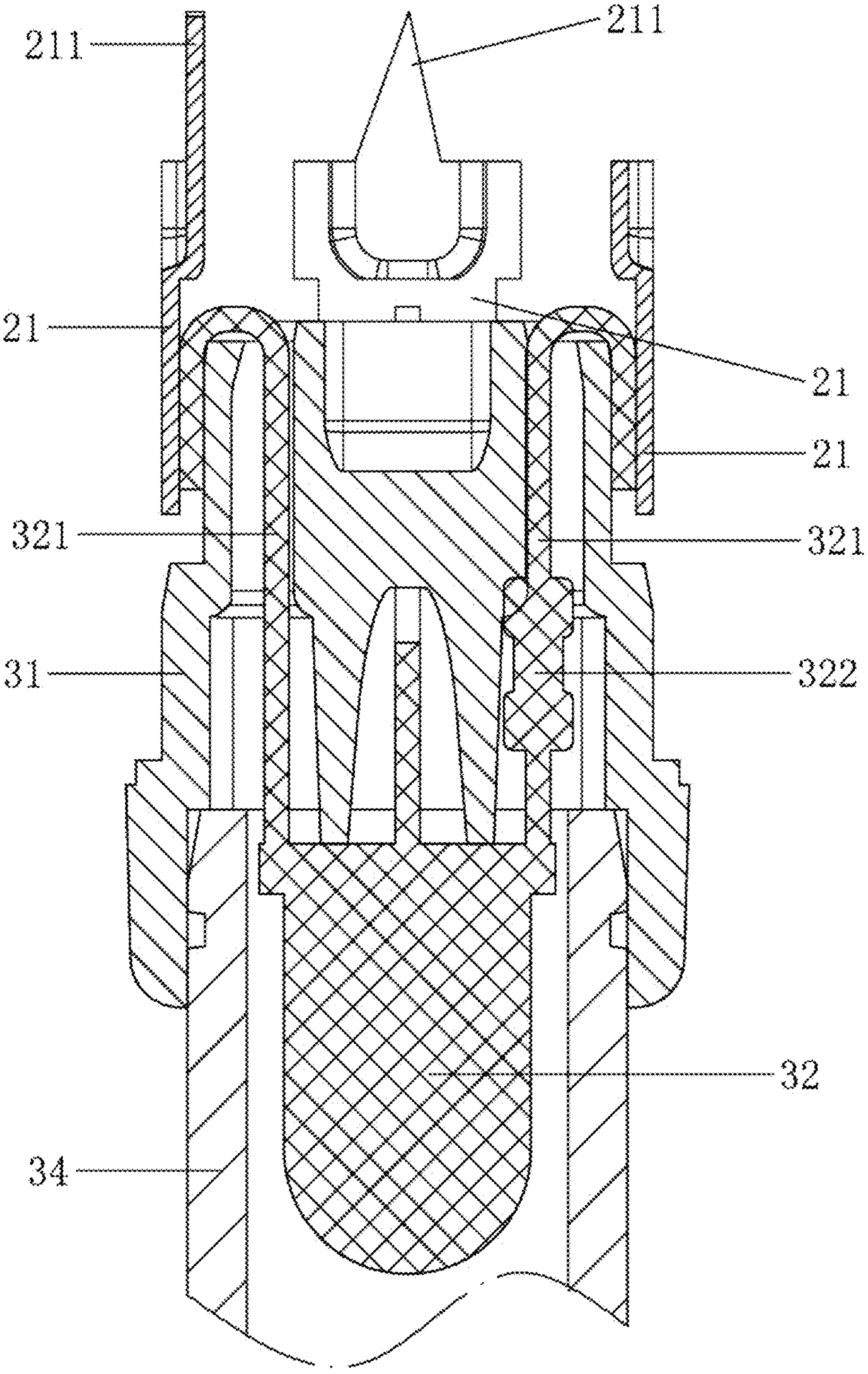
FIG. 6 is a sectional view of a lamp bulb part of a first embodiment.
Figure 7:
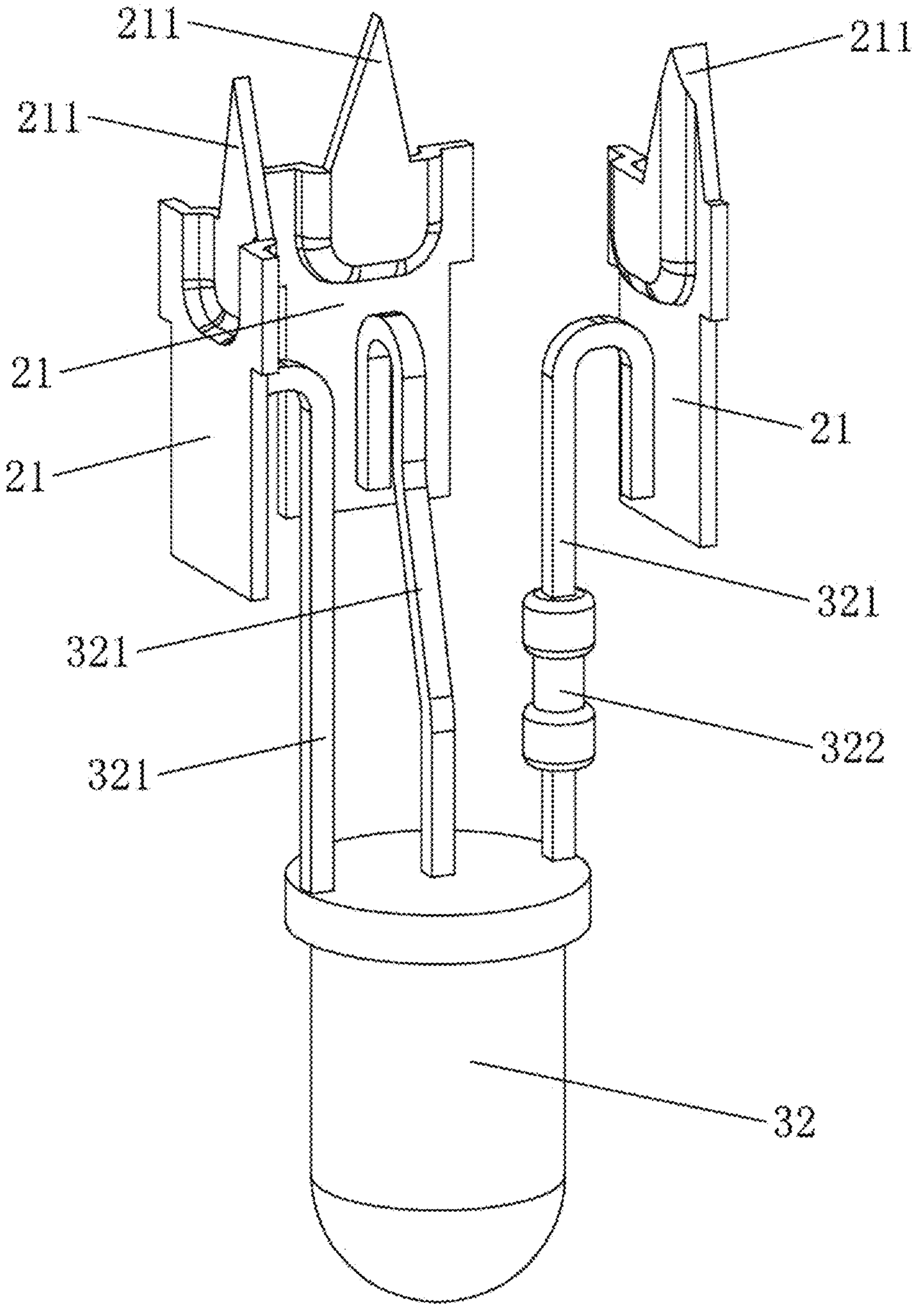
FIG. 7 is a partial structure diagram of a first embodiment.
Figure 8:
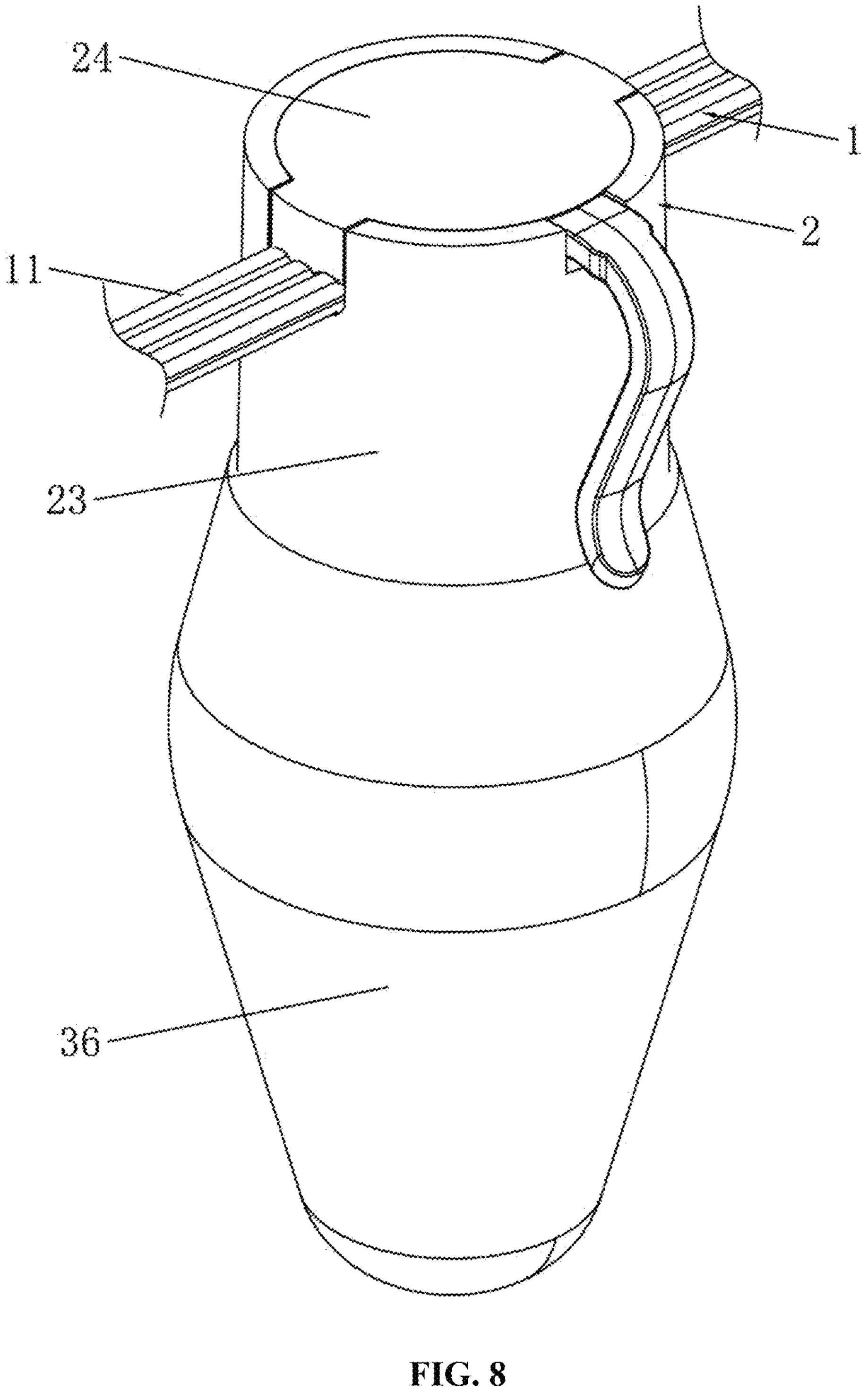
FIG. 8 is a structure diagram of a lamp cap part of a first embodiment which is not encapsulated.
Figure 9:
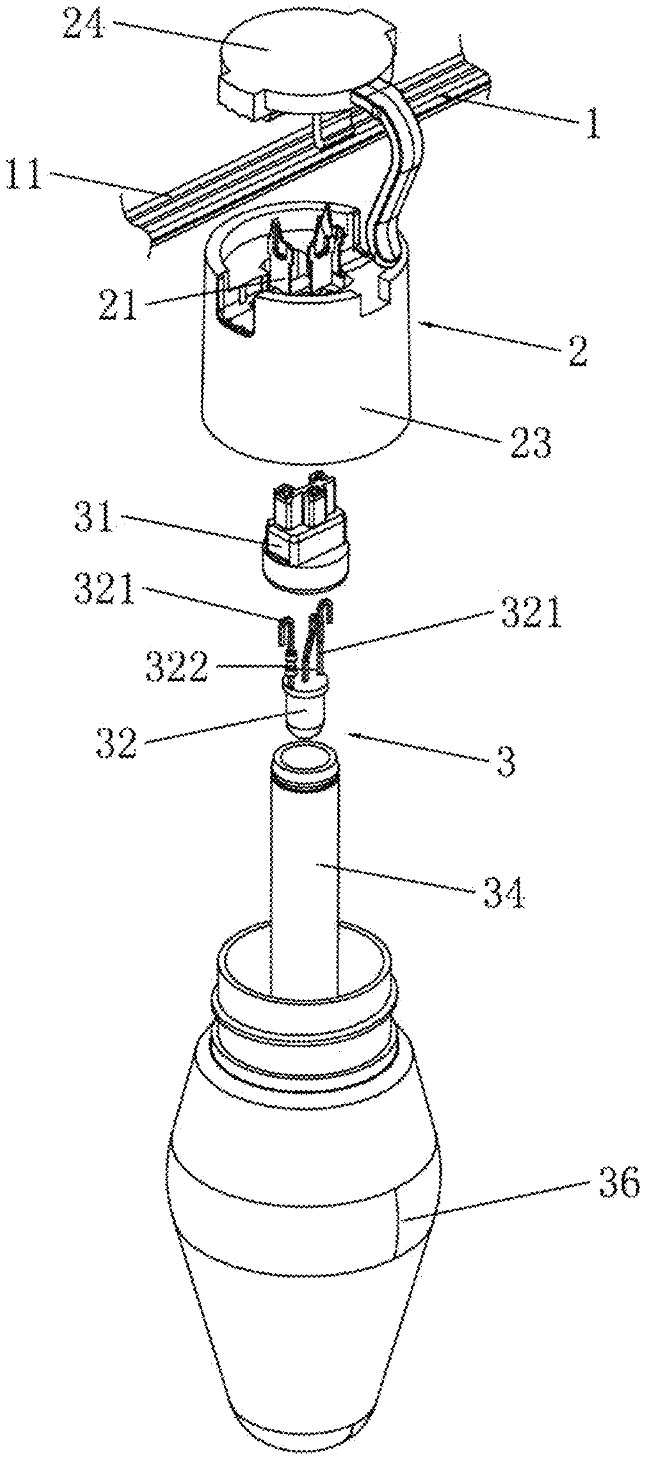
FIG. 9 is an exploded view of FIG. 8.
Figure 10:
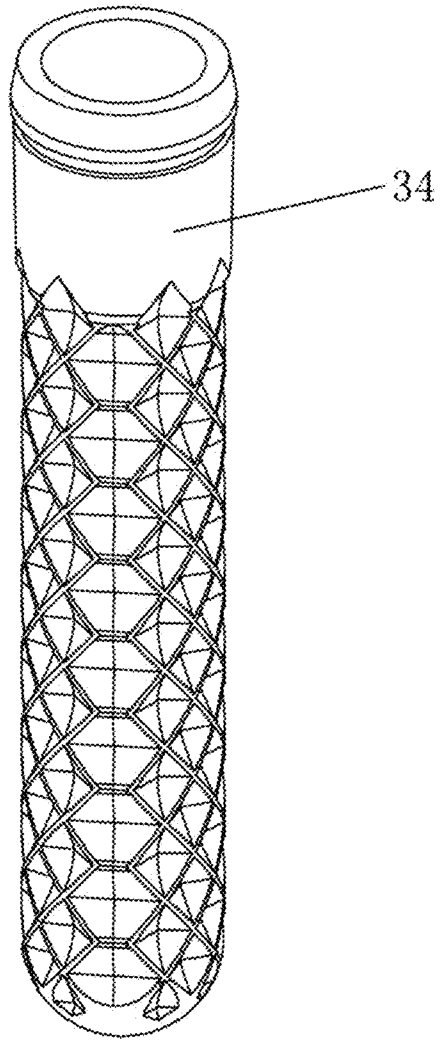
FIG. 10 is a structure diagram of another style of a light guide column of a first embodiment.
Figure 11:
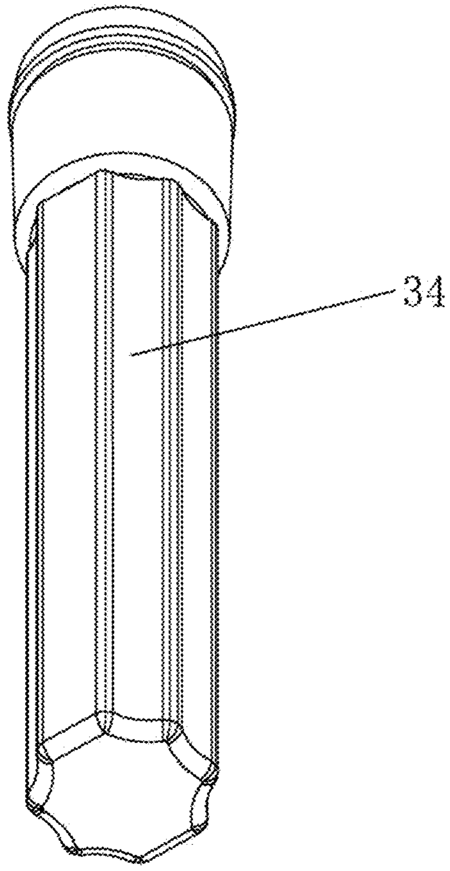
FIG. 11 is a structure diagram of yet another style of a light guide column of a first embodiment.
Figure 12:
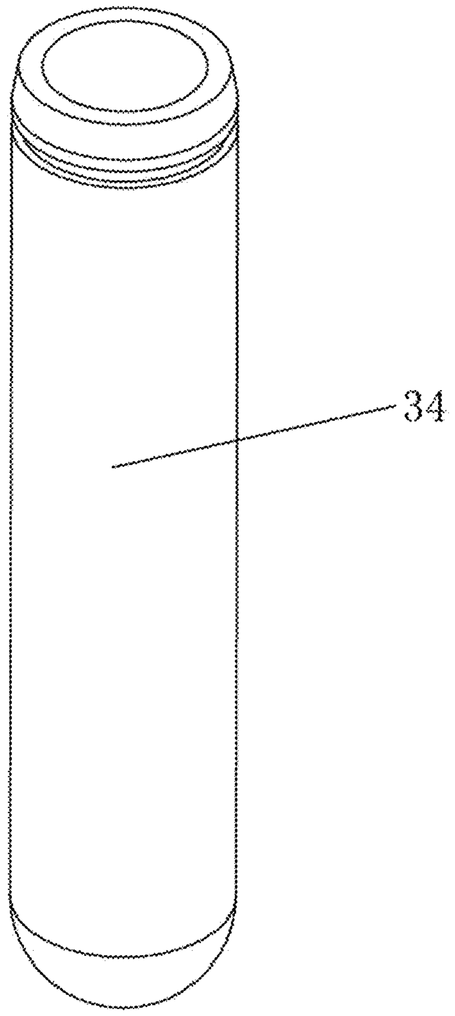
FIG. 12 is a structure diagram of still yet another style of a light guide column of a first embodiment.
Figure 13:
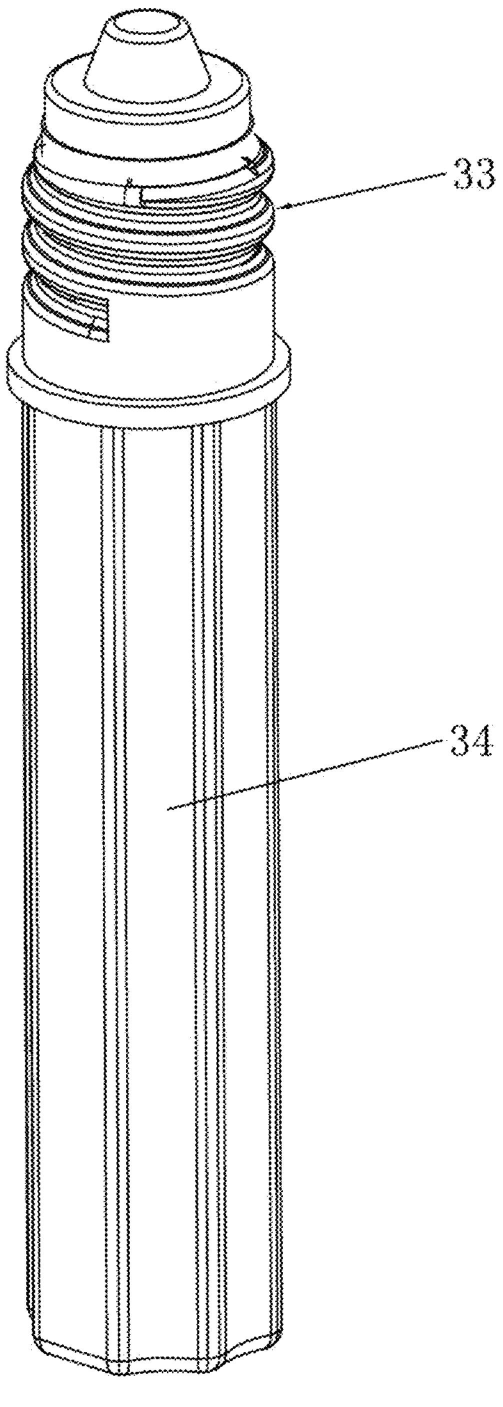
FIG. 13 is a structure diagram of a lamp bulb part of a second embodiment.
Figure 14:
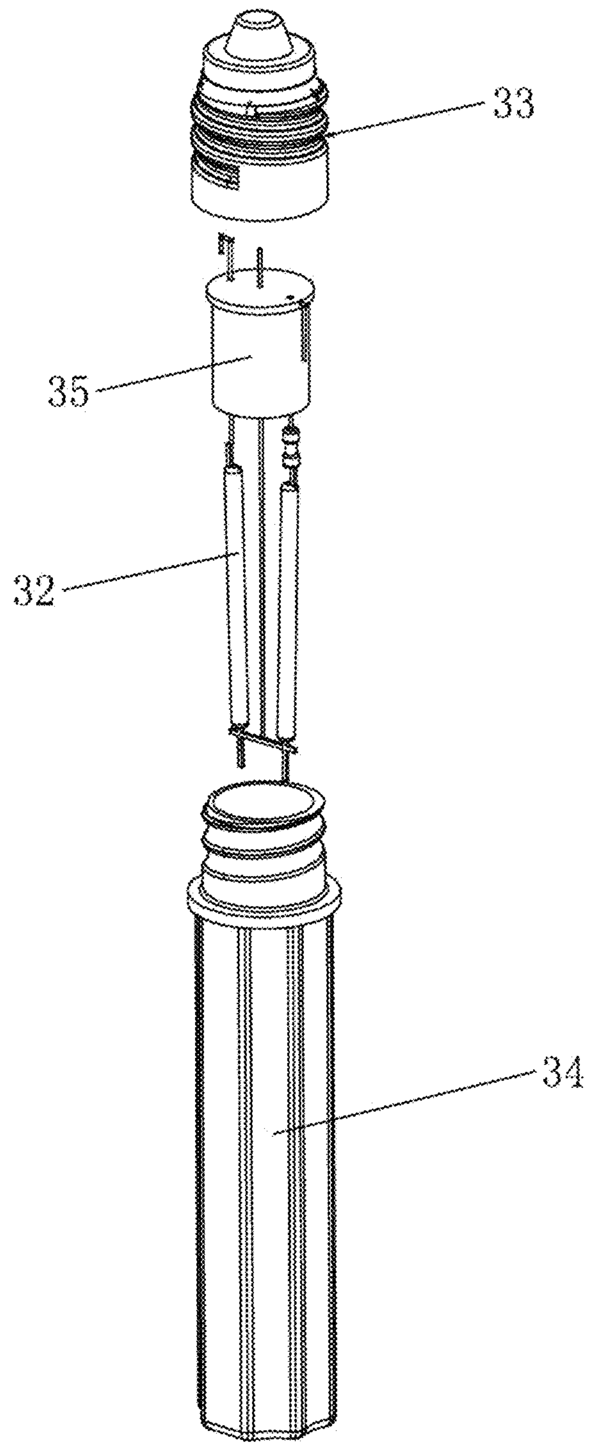
FIG. 14 is an exploded view of FIG. 13.
Figure 15:
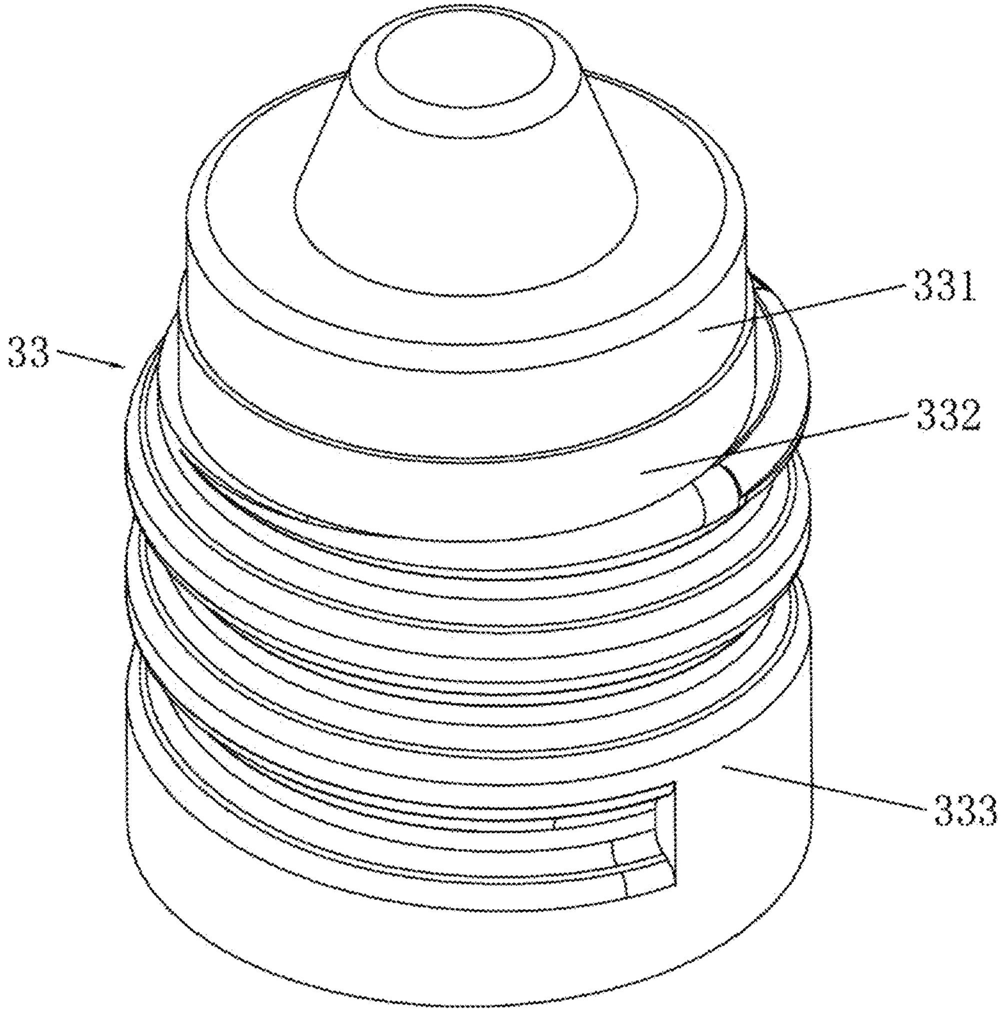
FIG. 15 is a structure diagram of a power connection copper head of a second embodiment.
Figure 16:
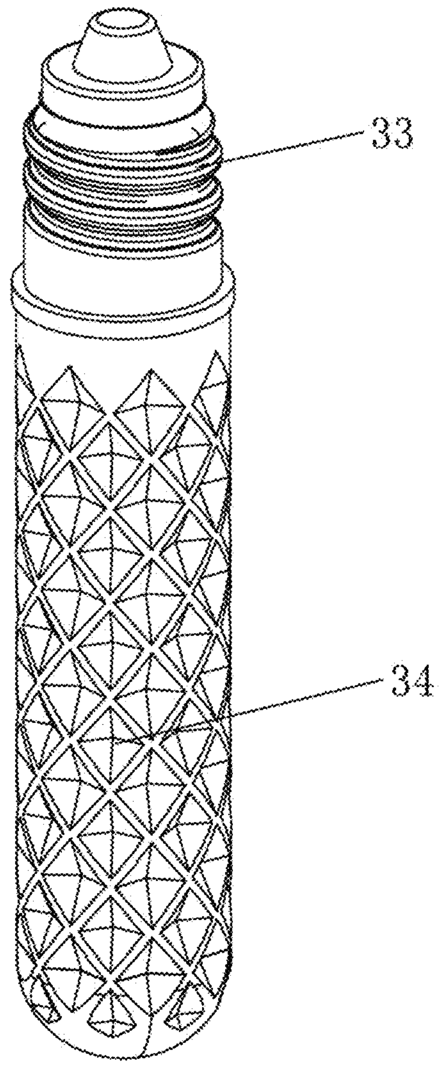
FIG. 16 is a structure diagram of another style of a second embodiment.
Figure 17:
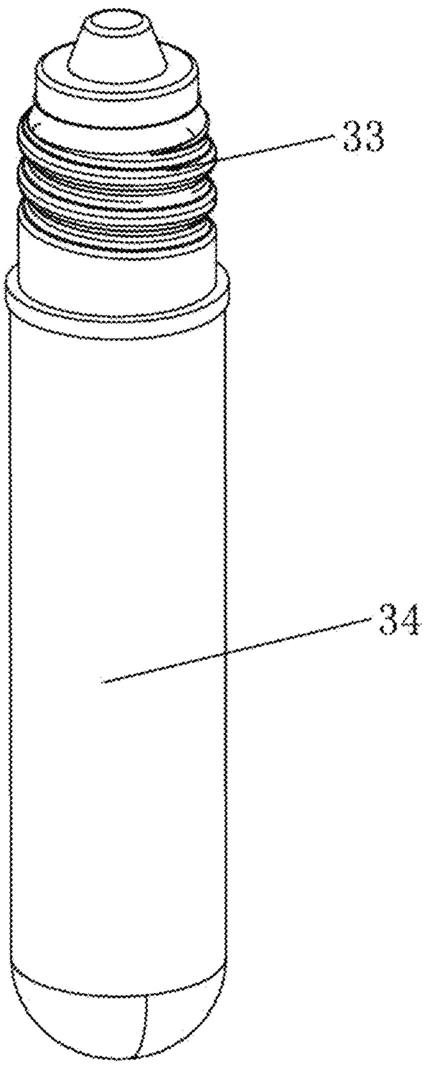
FIG. 17 is a structure diagram of yet another style of a second embodiment.
Figure 18:
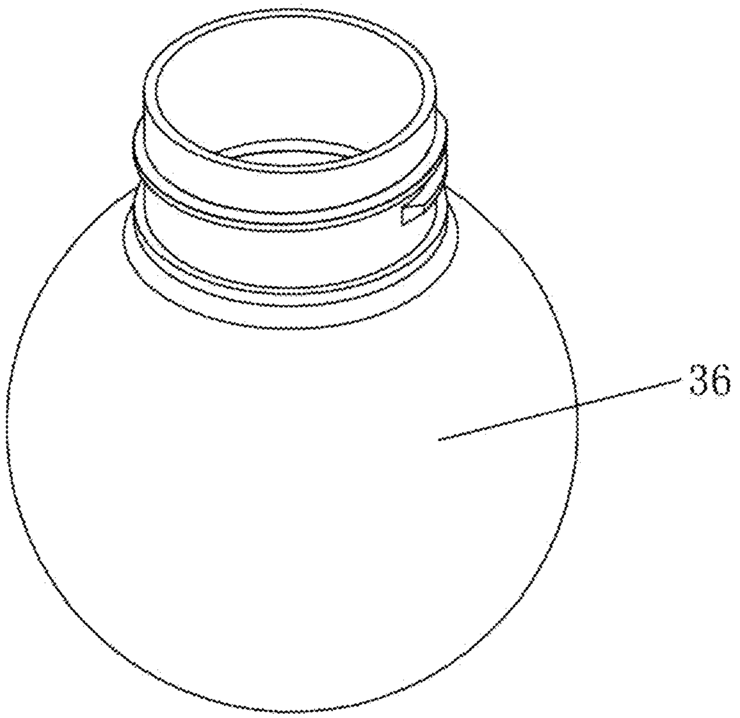
FIG. 18 is a structure diagram of a first mode of a transparent lampshade.
Figure 19:
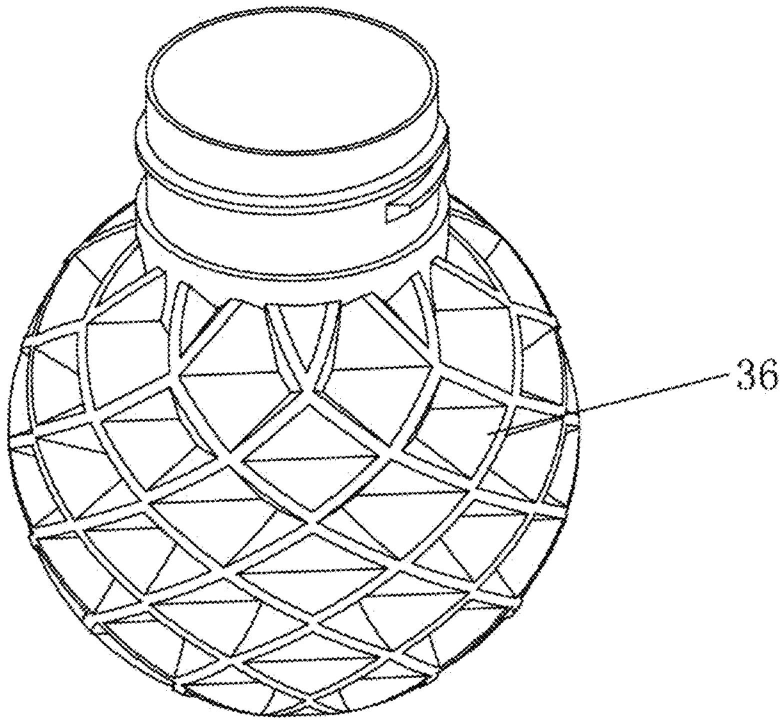
FIG. 19 is a structure diagram of a second mode of a transparent lampshade.
Figure 20:
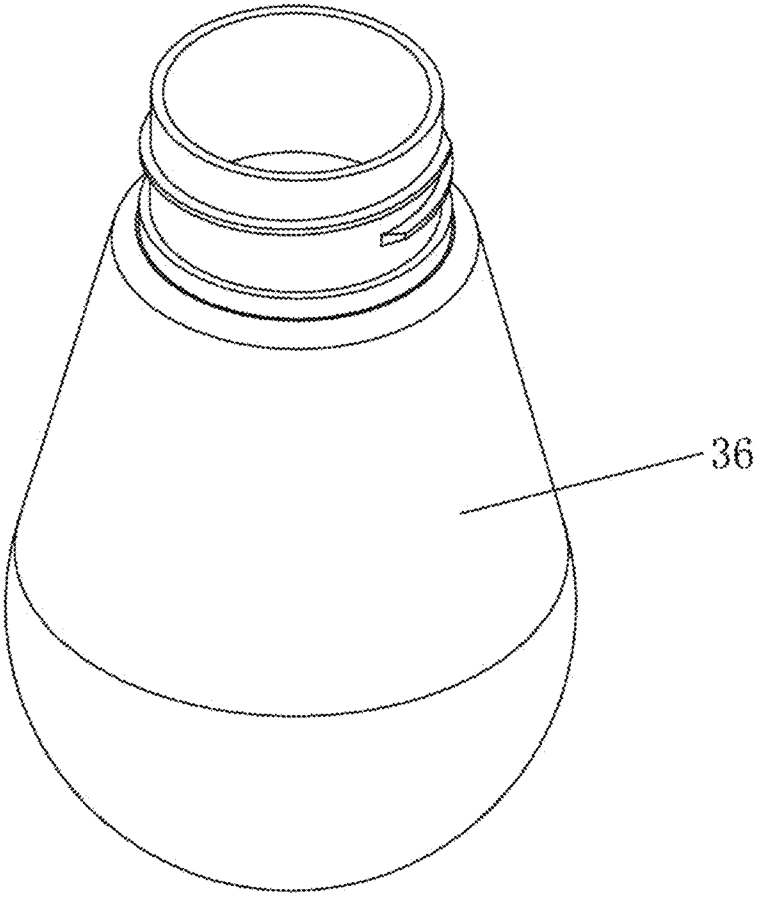
FIG. 20 is a structure diagram of a third mode of a transparent lampshade.
Figure 21:
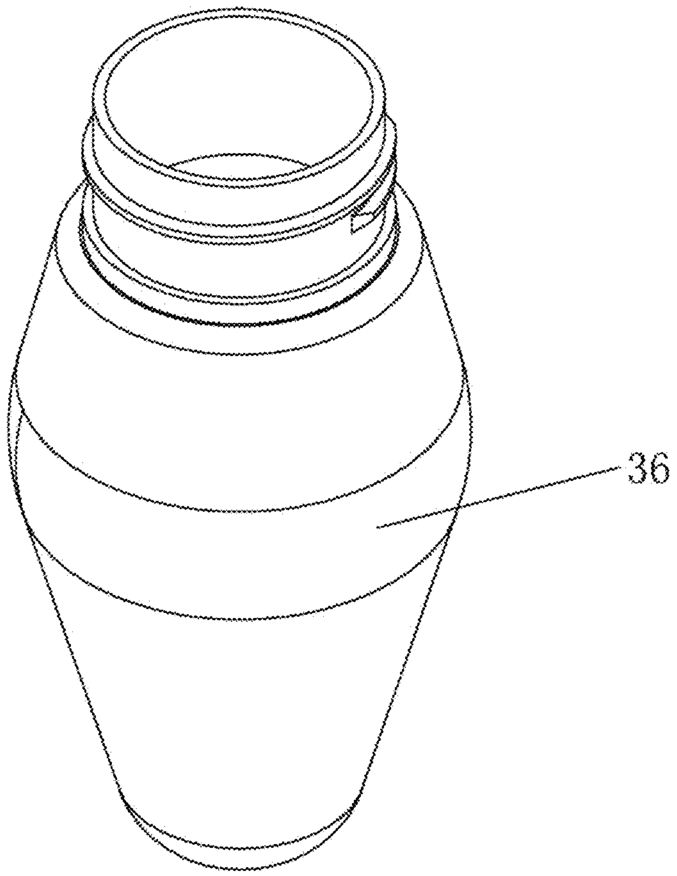
FIG. 21 is a structure diagram of a fourth mode of a transparent lampshade.
Figure 22:
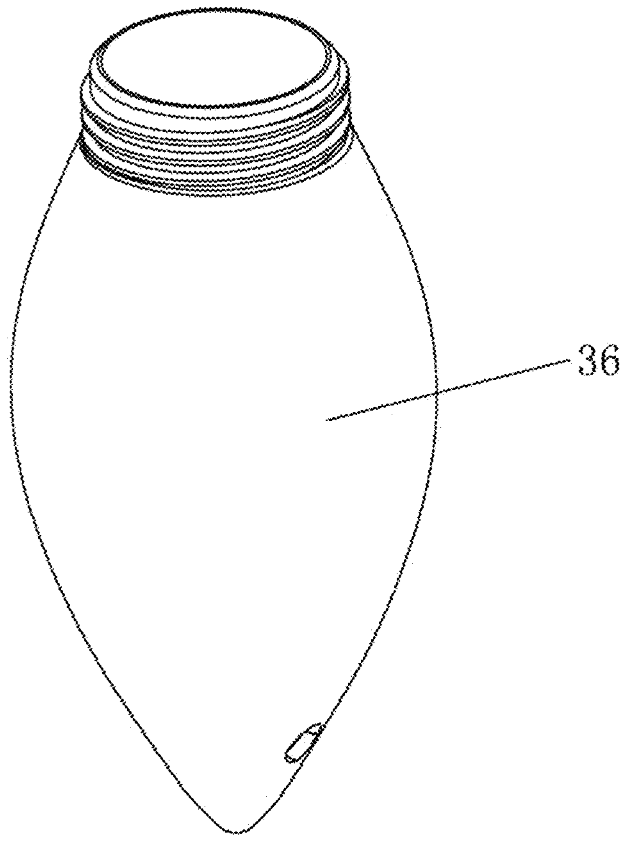
FIG. 22 is a structure diagram of a fifth mode of a transparent lampshade.
Figure 23:
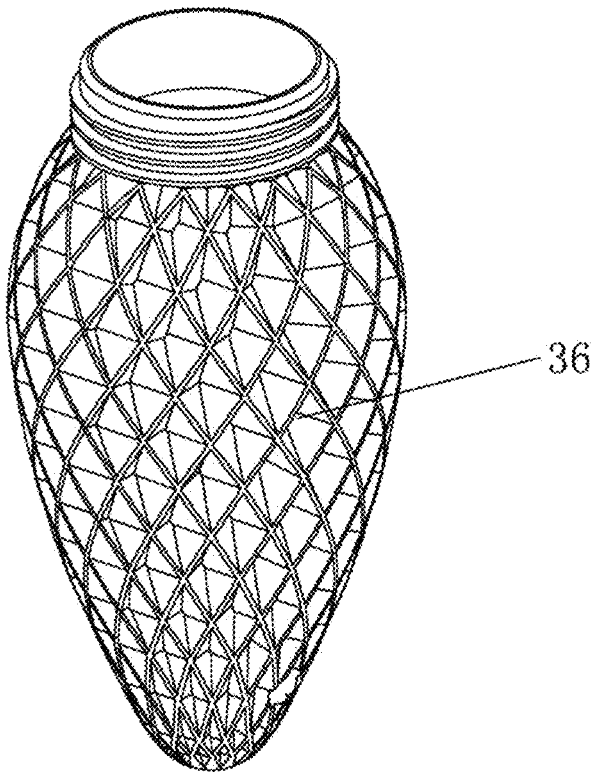
FIG. 23 is a structure diagram of a sixth mode of a transparent lampshade.
Figure 24:
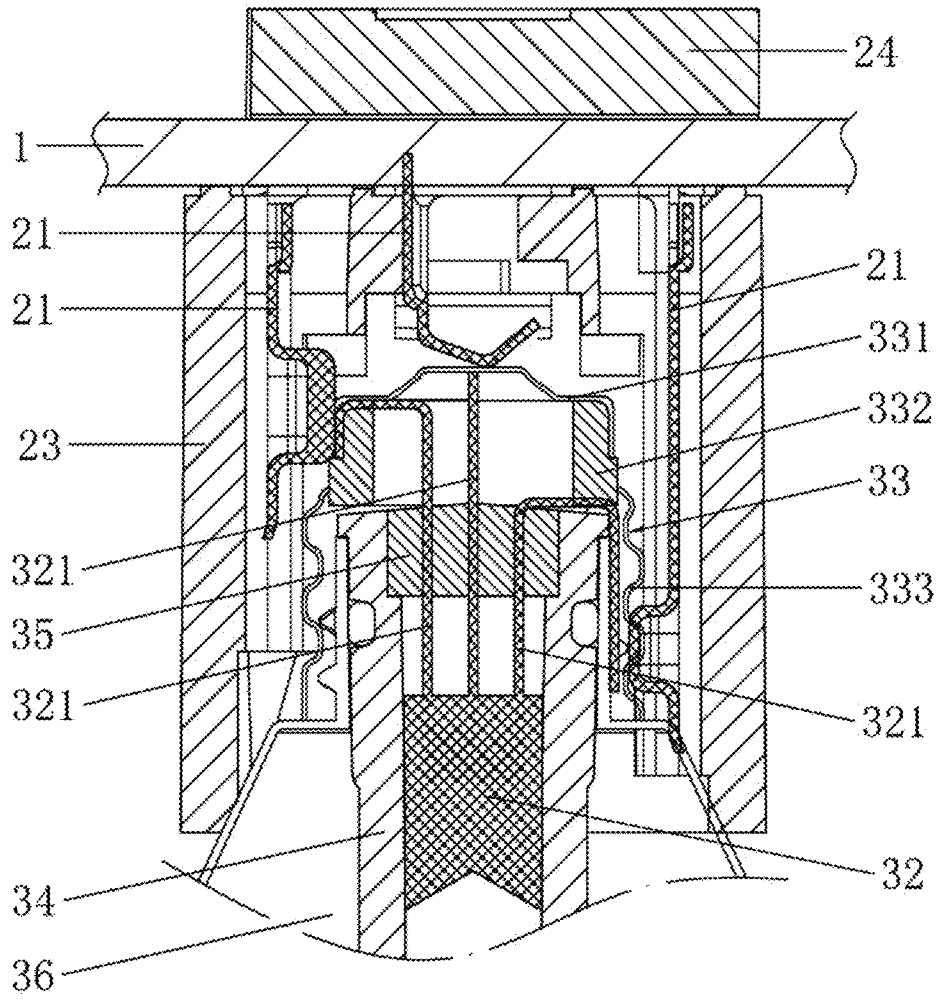
FIG. 24 is a sectional view of a third embodiment.
Figure 25:
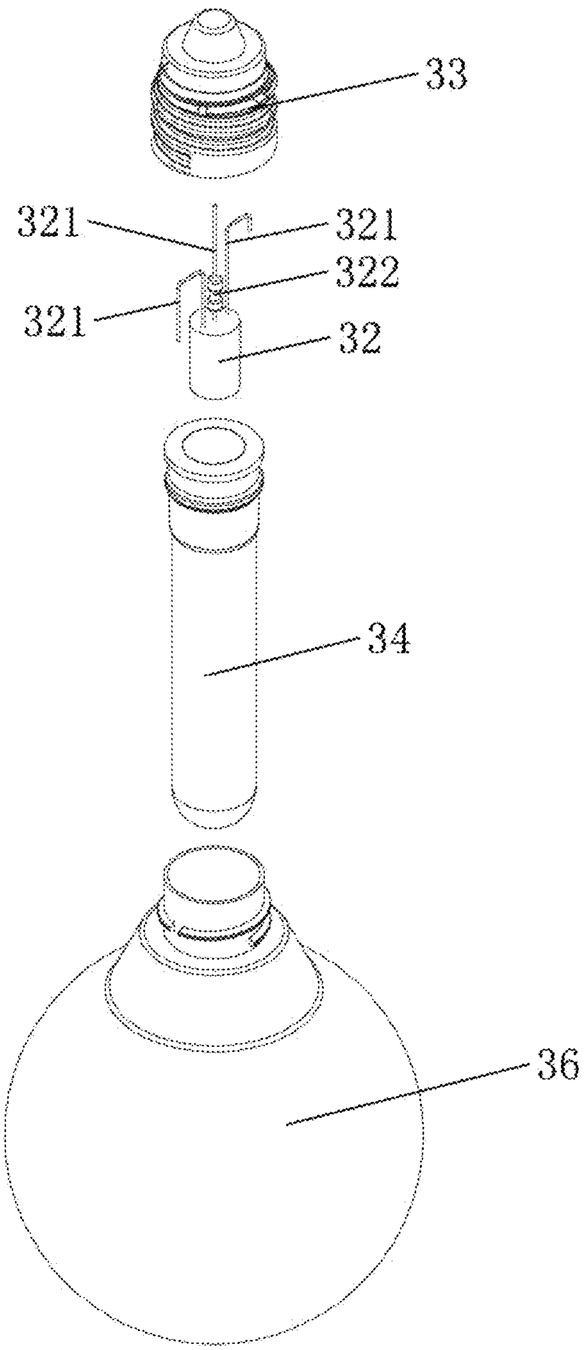
FIG. 25 is an exploded view of a lamp bulb part of a third embodiment.
Figure 26:
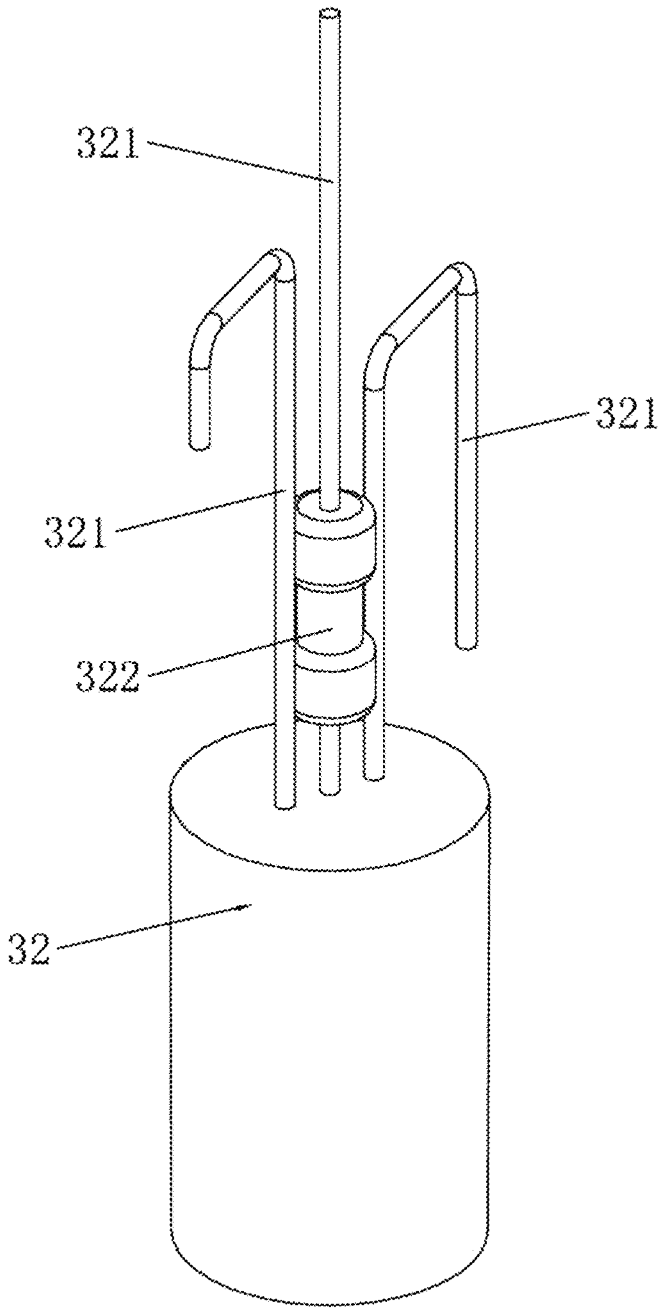
FIG. 26 is a structure diagram of a light-emitting source of a third embodiment.
Figure 27:
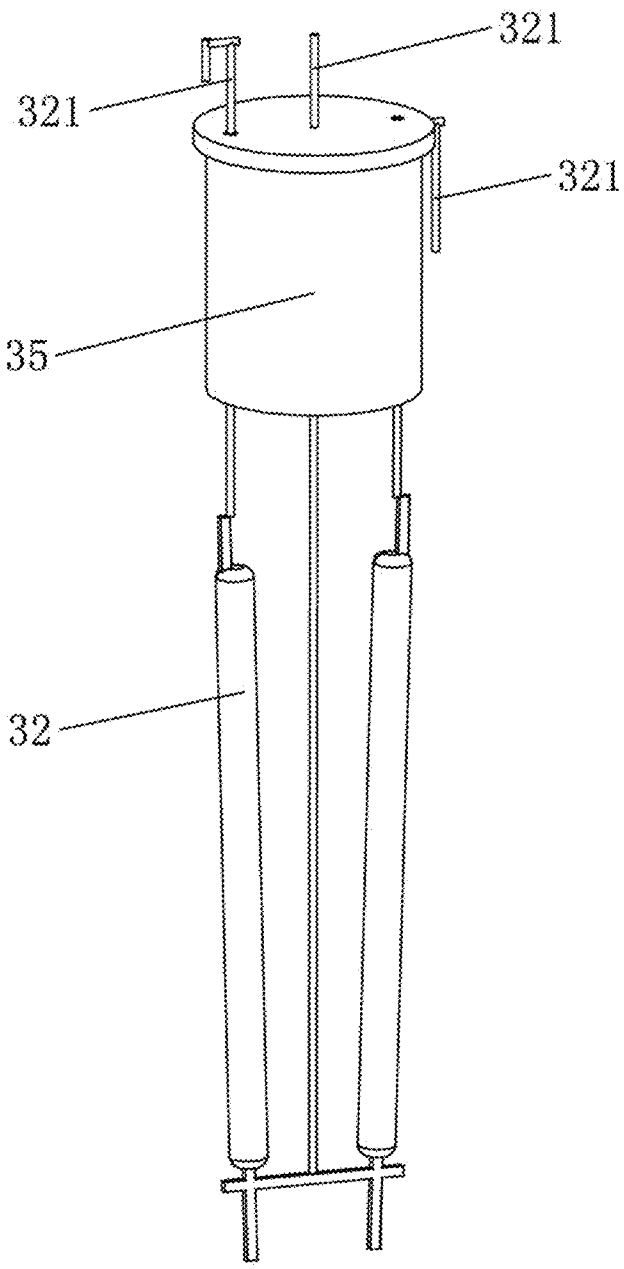
FIG. 27 is a structure diagram of another style of a light-emitting source of a third embodiment.
Figure 28:
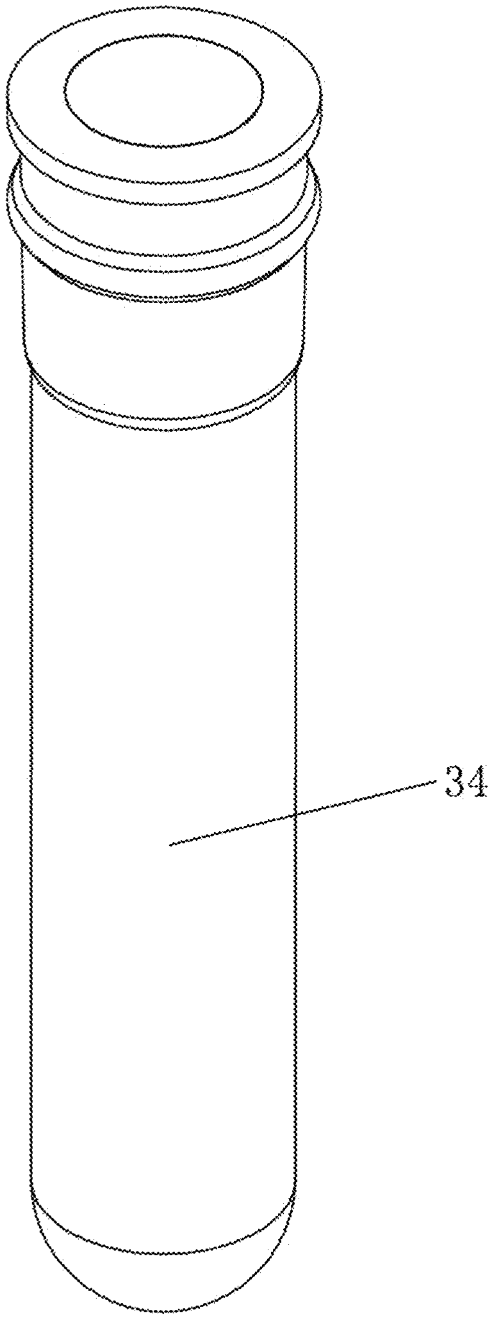
FIG. 28 is a structure diagram of a first style of a light guide column of a third embodiment.
Figure 29:
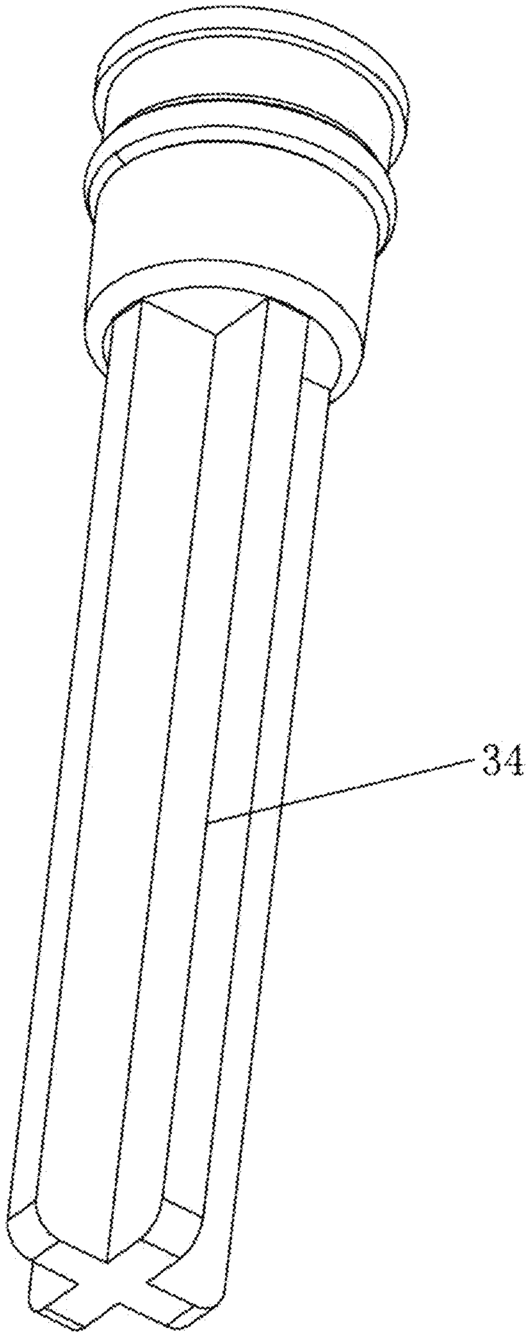
FIG. 29 is a structure diagram of a second style of a light guide column of a third embodiment.
Figure 30:
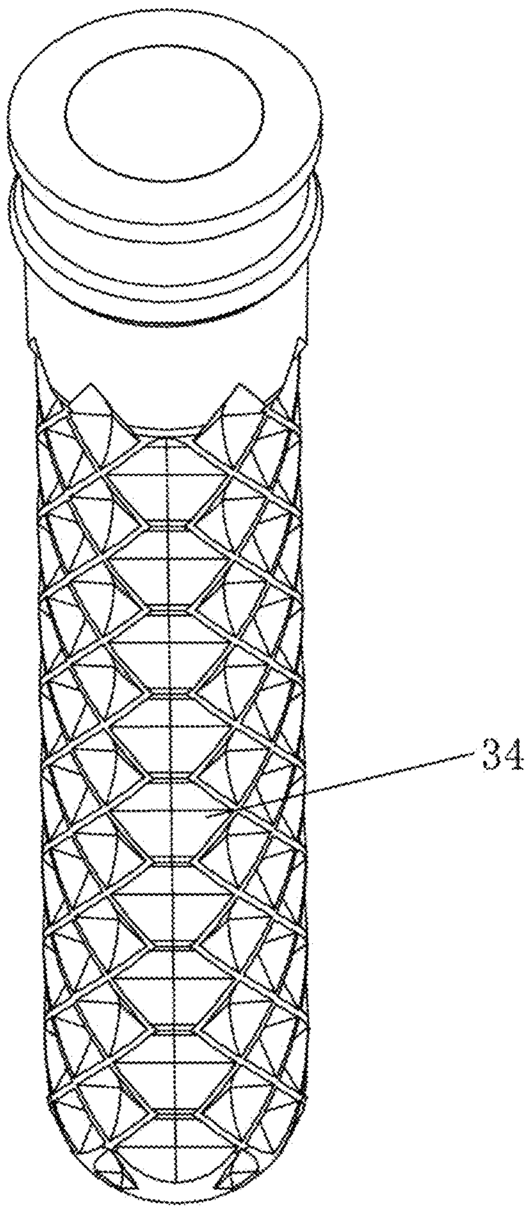
FIG. 30 is a structure diagram of a third style of a light guide column of a third embodiment.
Figure 31:
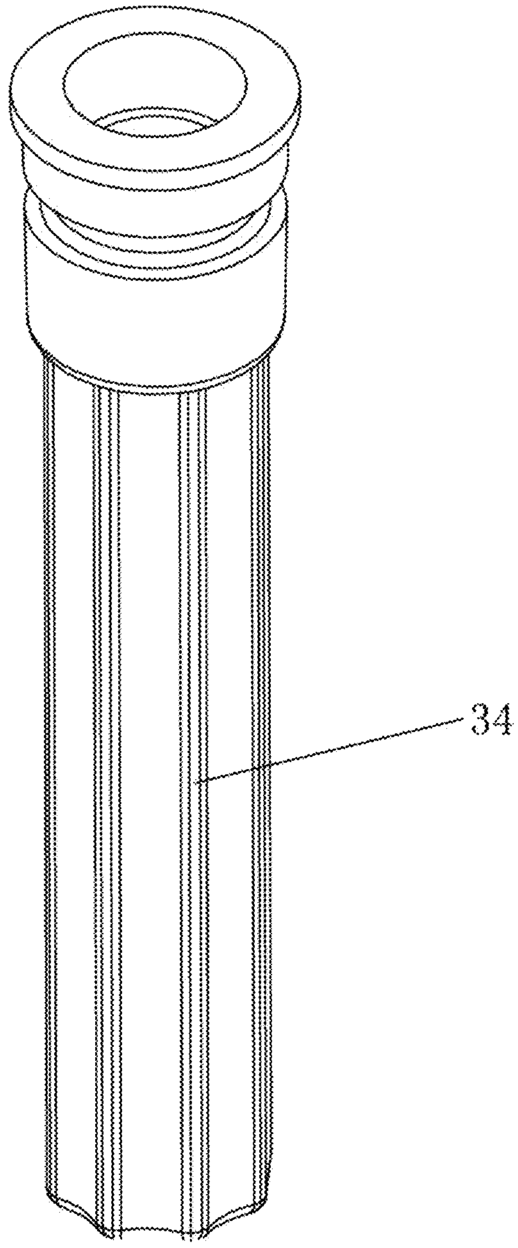
FIG. 31 is a structure diagram of a fourth style of a light guide column of a third embodiment.

It is to be further explained that for the new string lamp in the present Embodiment 1, as shown in FIG. 1 and FIG. 2, a lamp cap encapsulation element 25 is injection molded around the lamp cap part 2. Besides the above structure form of the lamp cap encapsulation element 25, as shown in FIG. 8 and FIG. 9, the lamp cap main body 23 may be directly provided with a corresponding hook, for the string lamp body to hang up.

To sum up, according to the above structural design, the new string lamp in the present Embodiment 1 is novel in structural design and convenient in demounting and repair.

Embodiment 2, as shown in FIG. 13 to FIG. 23, the present Embodiment 2 is different from the present Embodiment 1 in that: the lamp bulb part 3 is a screw type lamp bulb, including a power connection copper head 33 and a light-emitting source 32. The light-emitting source 32 is provided with three light source pins 321, respectively being a light source positive pin, a light source negative pin and a light source signal pin. The power connection copper head 33 is provided with copper head connection parts corresponding to each light source pin 321 of light-emitting source 32 respectively. Each light source pin 321 of the light-emitting source 32 contacts and is electrically conductive to a corresponding copper head connection part of the power connection copper head 33. The power connection copper head 33 of the lamp bulb part 3 is screwed onto the lamp cap part 2, and each copper head connection part of the power connection copper head 33 contacts and is electrically conductive to a corresponding metal terminal 21. Herein, the power connection copper head 33 is screwed onto the lamp cap main body 23.

Further, the power connection copper head 33 includes a copper head upper part 331, an intermediate plastic sleeve 332 and a copper head lower part 333. The copper head upper part 331 is sleeved on an upper end of the intermediate plastic sleeve 332, the copper head lower part 333 is sleeved on a lower end of the intermediate plastic sleeve 332, the copper head upper part 331 is provided with two copper head connection parts that are spaced and insulated from one another, and the copper head lower part 333 is provided with one copper head connection part. For the copper head upper part 331 in the present Embodiment 2, the structure is similar to traditional copper head structures. The power connection copper head 33 in the present Embodiment 2 is designed as a split structure. The copper head upper part 331 and the copper head lower part 333 are connected through the intermediate plastic sleeve 332, to meet the power connection requirements of the three light source pins 321 of the light-emitting source 32.

In addition, the lamp bulb part 3 further includes a light guide column 34. The light guide column 34 is screwed onto the power connection copper head 33. The light guide column 34 has an upper end provided with an end sealing plastic element 35, and the end sealing plastic element 35 is of a plastic element structure formed by glue application technologies, or the end sealing plastic element 35 is of a plastic plug structure. The light-emitting source 32 extends into the light guide column 34 and is fixed to the light guide column 34 through the end sealing plastic element 35.

Embodiment 3, as shown in FIG. 24 to FIG. 31, the present Embodiment 3 is different from the Embodiment 2 in that: the lamp bulb part 3 further includes a transparent lamp shell 36. The transparent lamp shell 36 is screwed onto the power connection copper head 33 and is sleeved around the light guide column 34. The light guide column 34 is fixed to an upper end of the transparent lamp shell 36.

It is to be explained that as shown in FIG. 28 to FIG. 31, the light guide column 34 is in the shape of a smooth column, a diamond faced column, a polygonal column or a cross column. Of course, the shape design of the above light guide column 34 does not constitute a limitation to the present Embodiment 2, that is, the light guide column 34 of the present Embodiment 2 may employ other designs of shapes.

Embodiment 4, as shown in FIG. 2, FIG. 5, FIG. 7, FIG. 9, FIG. 25 and FIG. 26, the present Embodiment 4 is different from the present Embodiment 1 in that: the light source pin 321 of the light-emitting source 32 is provided with a resistor 322.

The above resistor 322 can provide an overvoltage protection for the light-emitting source 32. When the voltage is too high, the resistor 322 can play a role of voltage divider, thereby protecting the light-emitting source 32.

The above are preferred embodiments of the present disclosure merely. For the ordinary skill in the field, changes may be made to both the specific implementation and the application scope according to the idea of the present disclosure. The content of this description should not be understood as a limitation to the present disclosure.

What is claimed is:

1. A new string lamp, comprising a power line (1) provided with string lamp bodies arranged in sequence, each string lamp body comprising a lamp cap part (2) and a lamp bulb part (3), the power line (1) penetrating through an inside of the lamp cap part (2) and being electrically connected to the lamp bulb part (3);

the inside of the lamp cap part (2) being provided with a plurality of metal terminals (21), wherein each metal terminal (21) has an upper end provided with a pointed penetrating part (211) projecting upward and extending in a spike shape, the pointed penetrating part (211) of each metal terminal (21) penetrating through a plastic sheath of the power line (1) and being electrically conductive to a line core of the power line (1);

the lamp bulb part (3) is a plug-in type lamp bulb;

wherein, the lamp bulb part (3) comprises a plastic core (31) and a light-emitting source (32) arranged on the plastic core (31), the light-emitting source (32) being provided with a plurality of light source pins (321);

the lamp cap part (2) comprises a lamp cap main body (23); an insertion part (22) is provided in an interior of the lamp cap main body (23); the insertion part (22) is a protrusion with a substantially rectangular cross-section; the plastic core (31) being inserted into the insertion part (22), and each light source pin (321) of the light-emitting source (32) contacting and being electrically conductive to a corresponding metal terminal (21);

wherein a ring groove is arranged around the insertion part (22); the lamp bulb part (3) further comprises a transparent lamp shell (36); an opening of the transparent lamp shell (36) is inserted in the ring groove.

2. The new string lamp according to claim 1, wherein the lamp cap part (2) comprises a lamp cap top cover (24) buckled on an upper end of the lamp cap main body (23), the power line (1) penetrating through the inside of the lamp cap part (2) is clamped between the lamp cap main body (23) and the lamp cap top cover (24); the lamp cap main body (23) is formed with terminal mounting holes (231) corresponding to each of the metal terminals (21) respectively, and each metal terminal (21) is clamped into a corresponding terminal mounting hole (231);

wherein, lower end of each metal terminal (21) extends to the insertion part (22).

3. The new string lamp according to claim 2, wherein the lamp cap top cover (24) is provided with a hook configured to hang up the string lamp body.

4. The new string lamp according to claim 1, wherein a lower end of the plastic core (31) is sleeved with a light guide column (34), and the light-emitting source (32) extends into the light guide column (34).

5. The new string lamp according to claim 4, wherein the light guide column (34) is in a shape of a polygonal column, a cross column or a diamond faced column.

6. The new string lamp according to claim 2, wherein the plurality of metal terminals (21) are respectively arranged at three inner walls of the insertion part (22).

7. The new string lamp according to claim 1, wherein a lamp cap encapsulation element (25) is injection molded around the lamp cap part (2).

8. The new string lamp according to claim 1, wherein the light-emitting source (32) is an RGB lamp strip or an RGB lamp bead, and the light source pin (321) of the light-emitting source (32) is provided with a resistor (322), the resistor (322) plays a role of voltage divider to protect the light-emitting source (32).

* * * * *